United States Patent [19]

Scholz et al.

[11] 4,080,269

[45] Mar. 21, 1978

[54] METHOD OF PRODUCING COATINGS HAVING A HIGH ABSORPTION IN THE RANGE OF THE SOLAR SPECTRUM

[75] Inventors: Heinz Scholz, Hergenrath; Hans Jungk, Aachen, both of Germany

[73] Assignee: U.S. Philips Corporation, New York, N.Y.

[21] Appl. No.: 749,743

[22] Filed: Dec. 13, 1976

[30] Foreign Application Priority Data

Dec. 17, 1975 Germany .............................. 2556716

[51] Int. Cl.$^2$ .......................... C25D 9/08; F24J 3/02
[52] U.S. Cl. .................................. 204/56 R; 126/270; 204/92
[58] Field of Search ..................... 204/48, 56 R, 43 T, 204/49, 56 M, 58, 92; 428/668, 673; 126/270

[56] References Cited

U.S. PATENT DOCUMENTS

| 2,834,725 | 5/1958 | Scheer et al. ...................... 204/43 T |
| 2,844,530 | 7/1958 | Wesley et al. ...................... 204/49 X |

*Primary Examiner*—G. L. Kaplan
*Attorney, Agent, or Firm*—Frank R. Trifari; Norman N. Spain

[57] ABSTRACT

Method of producing a black coating highly absorbant in the solar spectrum range by electrodeposition from an aqueous solution containing a soluble cobalt compound and a large amount of alkali thiocyanate.

6 Claims, 1 Drawing Figure

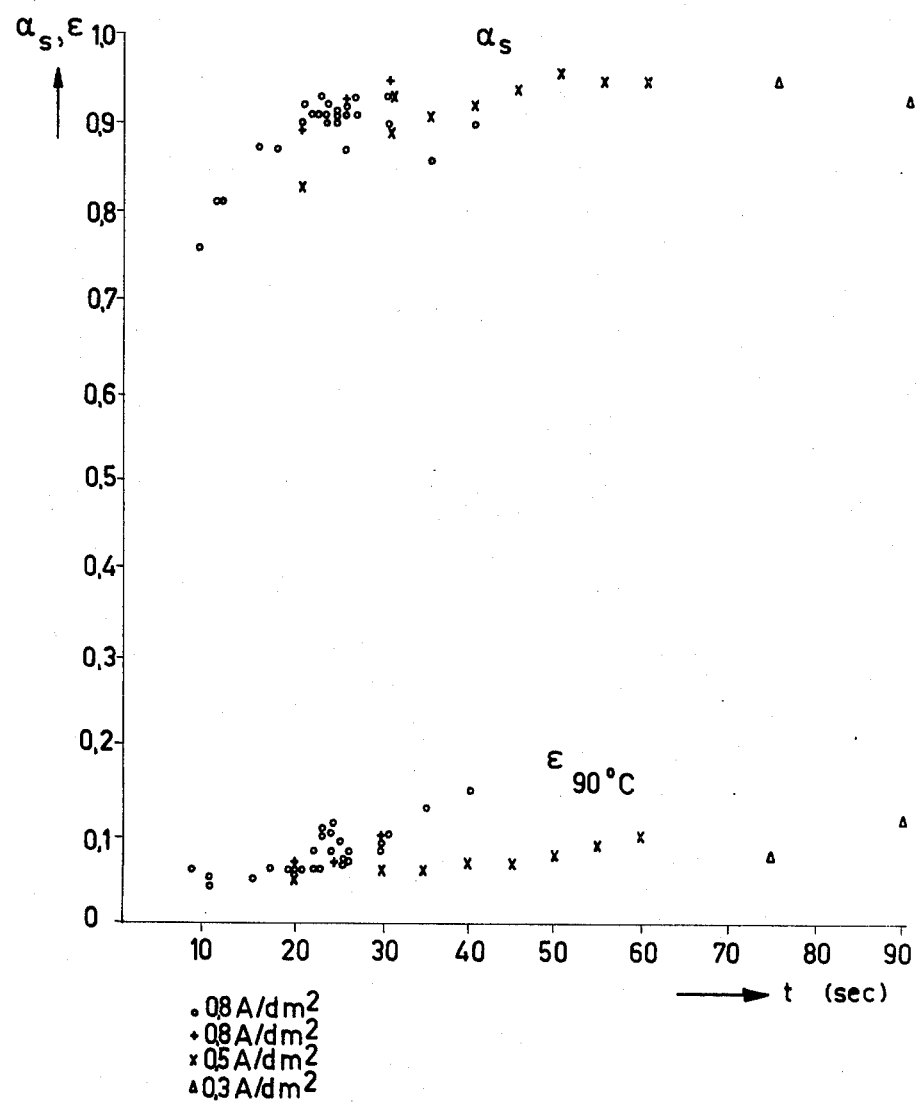

METHOD OF PRODUCING COATINGS HAVING A HIGH ABSORPTION IN THE RANGE OF THE SOLAR SPECTRUM

Black coatings are used for widely differing purposes. When colouring metals black the intention is, besides purely aesthetic purposes, to obtain special effects, for example the utilization of optical and heat-technical properties of the black colour, such as the reduction or prevention of the reflection in certain wavelength-ranges of the spectrum. Coatings having the properties of a substantially ideal black body in the range of the solar spectrum, which also substantially completely absorb the sunlight, however, have a low emission for infra-red radiation above 2.5 $\mu$m. They can be used as selective absorbers or, put differently, as selective solar collectors.

In principle there are three possibilities to obtain blackening of a metal surface:

The metal surface can be provided with a black coating, wherein the coatings consist as a rule of a pigment suspension in a binder. Whilst supplying a sufficient covering such coatings have a relatively high emissions value for thermal radiation and, consequently, are not suitable for use as a selective absorber.

Besides that oxide or sulphide layers can be produced by means of a chemical reaction with or on the base metal.

A third possibility is the electrolytic deposition of very finely distributed metals or metal compounds onto the base metal. Coatings of this kind are suitable for use as selective absorbing layers.

In the manufacture of this kind of layers the cathodic reduction of this cyanate ions in nickel-zinc-salt solutions is known. This method is used for "black nickel-plating" in which nickel and zinc are precipitated as a mixed sulphide on the cathode. "Black chrominumplating" is an electrolytic process in which a low-value chromium oxide is precipitated from a chromium acid-contaning bath (cf. "Oberflache-Surface", 11 (1970), 12, pages 302 etc.).

The absorption properties of electro deposited layers may be based on the fact that only the material properties of the deposits become active, but structural properties of the deposit (for example a pronounced erosion of the surface) may increase the absorption. The properties of these coatings which are in most cases very thin are, however, not only affected by their structure and the type of chemical compounds which participates in their build-up, but also by the surfaces and the structure of the base material on which they are deposited.

If layers of this type are used as selective absorbers for sunlight they are not usable within a narrow layer thickness range. The layer must be just that thick that the highest possible absorption is obtained in the range of the solar spectrum, whereas for the characteristic radiation of the absorption arrangement the radiation properties of the metal substrate must, if possible, be maintained. So the thickness of the layer must be small versus the wave length of the maximum of the thermal radiation at the operating temperature. For an operating temperature of 100° C this wave length is approximately 10 $\mu$m. Only under these conditions is it possible to keep the emissitivity for infra-red radiation of the metal + layer at a minimum. With thicker layers the considerably higher emission values of the compact coating material are quickly obtained so that there is no longer question of selective absorption.

The known black nickel layers are not so suitable for use as selective absorbers as they have only an unsatisfactory long-term stability at higher temperature, particularly in vacuum. In addition, when only one absorption layer is deposited it is hardly possible to obtain values higher than 0.9 for the solar absorption capability at a low emission of the heat radiation of approximately 0.1.

It is an object of the method according to invention to provide black layers having a high absorption in the range of the solar spectrum and a low emission in the range of the thermal radiation on one or a plurality of intermediate layer or layers of a highly infrared-reflecting metal on an electrically non-conducting substrate.

In accordance with the invention this object is fulfilled in that the layer is electrolytically deposited from an aqueous electrolyte containing a soluble cobalt compound and an alkali thiocyanate. In addition, the electrolyte may also contain a soluble nickel compound.

The invention is based on the recognition that in sulphide systems cations are substitutable in large concentration ranges. Herein also meta stable sulphide phases can be stabilized by mixed crystal formation and lattice defects can be compensated for.

The advantages obtained with the invention particularly consist in that a layer containing cobalt sulphide can be formed in a technologically very simple manner, which layer has a substantially total absorption in the range of the sunlight but only a low emissitivity for radiation in the infra--red spectrum range, it being possible to adjust the required accurate layer thickness to a defined value without difficulties by means of a corresponding adjustment of the parameters current density and duration of the electrolytic process. Surprisingly, the optimum thickness of the coat can furthermore be adjusted with given starting electrolytes by means of a subsequent chemical etching operation with mineral acids, which is in contradiction with the experience in the analytical chemistry, where CoS and NiS remain insoluble in the chemical separation process under similar conditions. On the other hand, it is surprising and unexpected that the values for the absorption capability increase during etching, as normally increasing values are found for the absorption capability at an increasing thickness of the layer.

The invention will now be described in greater detail with reference to the following examples and the drawing the sole figure of which shows the dependence of the value for the absorption in the range of the sunligt $\alpha_S$ and for the emission of infra-red radiation $\epsilon$ at given operating conditions for an absorber having a CoS-layer in accordance with the first embodiment.

EXAMPLE I

Selectively absorbing cobalt sulphide coats can be produced from electrolytes whose salt content may vary within wide limits. Both the chloride and also other cobalt salts, for example sulphate, nitrate or acetate can be utilized. For a ratio $CoCl_2.6H_2O$: KSCN=1:1 (KSCN may be replaced by NaSCN) the concentrations may be varied in the range from 1 to more than 50% of the total concentration. It is also possible to change the ratio $CoCl_2 . 6H_2O$: KSCN between 0.5 and 20 without more.

A typical composition of the electrolyte contains 2.5% $CoCl_2.6H_2O$ and 2.5% KSCN. Favourable current densities are between 0.1 and 1A/dm². At 0.5A/dm² and a period of electrolysis of approximately 1 minute copper and nickel sheets can be coated such that the following values for the absorption of radiation from the range of the sunlight $\alpha_S$ and for the emission of infra-red radiation at a perpendicular radiation at an operating temperature of the absorber of 90° C can be obtained in a reproducible manner. $\alpha_S = 0.97$ and $\epsilon_{90°}C = 0.06$–$0.07$ on copper substrates and $\alpha_S = 0.97$ and $\epsilon_{90°}C = 0.07$–$0.08$ on nickel substrates and $\alpha_S = 0.96$ and $\epsilon_{90°}C = 0.04$ on silverplated glass substrates.

FIG. 1 shows values for the absorption of radiation from the range of the sunlight $\alpha_S$ and for the emission of infra-red radiation $\epsilon$ at an operating temperature T=90° C of an absorber having a cobalt sulphide layer in accordance with the first embodiment, as a function of the current density A/dm$^2$, the period of electrolysis ($t$) in seconds and the anode material. The layers are then less than 0.1 $\mu$m thick. The measuring points are differentiated according to the current densities used as indicated, with an Ni anode for the first-mentioned value and an Al anode for the remaining values.

EXAMPLE II

A selectively absorbing cobalt-nickel mixed sulphide layer is cathodically precipitated from an electrolyte of the following composition:
2.5 g CoCl$_2$.6H$_2$O + 2.5 g NiCl$_2$.6H$_2$O + 5 g KSCN in 200 ml H$_2$O
or
5.0 g CoCl$_2$.6H$_2$O + 1.0 g NiSO$_4$.6H$_2$O + 5 g KSCN in 200 ml H$_2$O
or
5.0 g CoCl$_2$.6H$_2$O + 1.0 g Ni(NO$_3$)$_2$.6H$_2$O + 5 g KSCN in 200 ml H$_2$O,
under comparable conditions as in the first example the following values are obtained for the absorption of radiation from the range of the sunlight $\alpha_S$ and for the emission of infra-red radiation $\epsilon$: $\alpha_S = 0.96$ and $\epsilon_{90°}C = 0.08$.

EXAMPLE III

A selectively absorbing cobalt-nickel mixed sulphide coat is precipitated from an electrolyte of the following composition:
10% NiCl$_2$.6H$_2$O, 7% CoCl$_2$.6H$_2$O, 2.5 % KSCN and 4% NH$_4$Cl in water.

The procedure is such that in a first step after an electrolysis period of approximately 1 to 2 minutes at a current density of 0.5 A/dm$^2$ a layer is obtained having a value of approximately 0.6 for the absorption of radiation from the range of the sunlight $\alpha_S$ and which has a bright metal-like appearance. In a second step this layer is then etched for approximately 0.5 minutes with 2n HCl to a layer thickness which yields a value of 0.93 for the absorption of radiation from the range of the sunlight $\alpha_S$ and a value of 0.07 for the emission of infra-red radiation $\epsilon_{90°}C$.

EXAMPLE IV

A selectively absorbing cobalt sulphide layer is deposited from an electrolyte which contains ammonium ions. In a first production step a bright metal-like layer is obtained which has a value of 0.6 for the absorption of radiation from the range of the sunlight $\alpha_S$. In a second step, as in the third example, etching is done with 2 n HCl for such a period that a value of 0.87 is obtained for the absorption of radiation from the range of the sunlight $\alpha_S$ and a value of 0.06 for the emission of infra-red radiation $\epsilon_{90°}C$. The electrolyte contains 2.5% CoCl$_2$.6H$_2$O and 2.5% NH$_4$SCN.

The fact that the values for $\alpha_S$ are higher in the two last-mentioned examples after etching can presumably be traced back to the influence of ammonium ions in the formation of the layer.

EXAMPLE V

If cobalt sulphide is precipitated onto iron in accordance with the conditions described in the first example then the values for $\alpha_S = 0.93$ and for $\epsilon_{90°}C = 0.10$ can be obtained. However, the deposit is not so homogeneous as on copper or nickel. This is presumably caused by the cubic body-centered structure of iron, whose lattice constant is approximately 20% smaller as that of copper and nickel. Copper and nickel have a cubic face-centered lattice, whose lattice constant corresponds, a few percents excepted, to the a-axis of the sulphide which crystallizes in the B8-type. For an improved "chemical matching" 0.25% FeCl$_2$.4H$_2$O or 0.25% FeSO$_4$.7H$_2$O or 0.25% Fe(NO$_3$)$_3$. 9H$_2$O are added to the electrolyte which has a composition of 2.5% CoCl$_2$.6H$_2$O + 2.5% KSCN. At a current density of 0.5A/dm$^2$ and a duration of electrolysis of approximately 1 minute the following values are obtained for the absorption of radiation from the range of the sunlight $\alpha_S$ and for the emission of infra-red radiation $\epsilon_{90°}C$: $\alpha_S = 0.98$ and $\epsilon_{90°}C = 0.08$.

The same values are obtained with this electrolyte on iron and nickel substrates.

When copper is used as a substrate a value of only 0.05 is obtained for the same value for $\alpha_S$ and for $\epsilon_{90°}C$.

In the Co-Fe-sulphide system the most favourable combinations for the values for $\alpha_S$ and $\epsilon_{90°}C$ are at a high ratio of cobalt to iron. If this ratio becomes very small then an etching operation is necessary as described in the third example. Then it is possible to obtain the following values: for $\alpha_S = 0.94$ and for $\epsilon_{90°}C = 0.1$.

What is claimed is:

1. A method of producing a black coating having a high degree of absorption in the solar region and a low degree of heat radiation on a metal layer highly reflective of infrared radiation, said method comprising electrodepositing said black coating on said metal layer from an aqueous solution containing an electrolyte consisting essentially of a soluble cobalt compound and an alkali thiocyanate in the ratio by weight of the alkali thiocyanate as KSCN to the cobalt compound as CoCl$_2$6H$_2$O of 20.1 to 1:2.

2. The method of claim 1 wherein the electrolyte in addition contains at least one compound selected from the group consisting of soluble nickel and soluble iron compounds.

3. The method of claim 2 wherein the metal layer is a silver layer.

4. The method of claim 1 wherein the metal layer is a silver layer.

5. The method of claim 1 wherein from 15 to 50% by weight of the electrolyte consists of the alkali thiocyanate.

6. An article comprising an electrically non-conductive substrate having deposited thereon at least one intermediate infra-red reflecting metal layer coated with a black coating highly absorptive in the solar region and having a low degree of heat radiation, said black coating being formed by the method of claim 1.

* * * * *